United States Patent Office 3,706,780
Patented Dec. 19, 1972

3,706,780
PHENYLDIALKYLBICYCLO-[2.2.2]-OCT-2-ENE NITRILES
Kyu Tai Lee, Kingsridge, Del., assignor to E. I. du Pont de Nemours and Company, Wilmington, Del.
No Drawing. Original application Jan. 29, 1969, Ser. No. 795,059. Divided and this application Mar. 8, 1971, Ser. No. 122,237
Int. Cl. C07c *121/64*
U.S. Cl. 260—465 F             6 Claims

ABSTRACT OF THE DISCLOSURE

Preparing a compound of the formula:

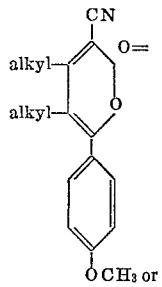

by admixing a diketone compound of the formula:

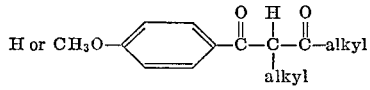

and ethyl cyanoacetate in the presence of a catalytic amount of ammonium acetate and glacial acetic acid; and thereafter via an ethylene addition reaction with a compound of the formula:

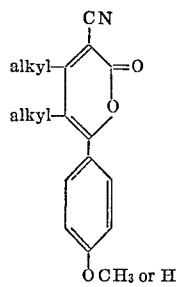

producing a compound of the formula:

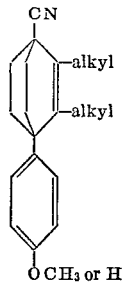

This is a division of application Ser. No. 795,059, filed Jan. 29, 1969, now U.S. Pat. No. 3,595,878.

BACKGROUND OF THE INVENTION

As described in my pending joint patent application, Ser. No. 723,596, filed Apr. 23, 1968, with Walter A. Gregory, 4-(p-methoxyphenyl)- and 4-phenyl(alkyl substituted bicyclo[2.2.2]octane - 1 - carboxylic acids and related compounds are useful antifertility agents. Such compounds are synthesized by beginning with the appropriate phenyl substituted α-pyrone; i.e., 6-phenyl α-pyrone-3-carboxylates. One of these α-pyrones is treated with an alkylene compound such as ethylene at high temperature and pressure for up to twenty-five hours to produce a 4-phenyl-1,3-cyclohexadiene-1-carboxylic acid ethyl ester. This product is then subjected to further high temperature and pressure in the presence of ethylene to produce the desired 4-phenylbicyclo[2.2.2]octene carboxylic acid ethyl ester which is easily converted to its free acid by alkaline hydrolysis, followed by acidification. The most desirable antifertility product is then obtained by simple reduction.

Further process chemistry for making 4-phenylbicyclo-[2.2.2]oct - 2 - ene - 1 - carboxylic acids is described in an article by Baker and Stock, Journal of Organic Chemistry, vol. 32, pages 3344–3348 (1967). My invention solves a problem of Baker and Stock; i.e., obtaining "appropriately substituted pyrones" for synthesizing bicyclo-[2.2.2]oct-2-enes.

The disclosure in my pending joint application and the Baker and Stock article described above together with the prior art referenced therein is herein incorporated by reference.

I have now discovered a new route for making 4-phenyl-dialkyl-bicyclo[2.2.2]oct - 2 - ene - 1 - carboxylic acids which involves the production of two groups of novel cyano-substituted compounds.

SUMMARY OF THE INVENTION

This invention relates to p-methoxyphenyl- and phenyl-dialkyl α-pyrones and dialkylbicyclo[2.2.2]oct - 2 - enes. More specifically, this invention relates to 6-(p-methoxyphenyl)- and 6-phenyl - 4,5 - dialkyl α-pyrene-3-nitriles and 4-(p-methoxyphenyl)- and 4-phenyl - 2,3 - dialkylbicyclo[2.2.2]oct - 2 - ene nitriles and a method for producing such α-pyrone-3-nitriles. Compounds of this invention have the following formulae:

(1)

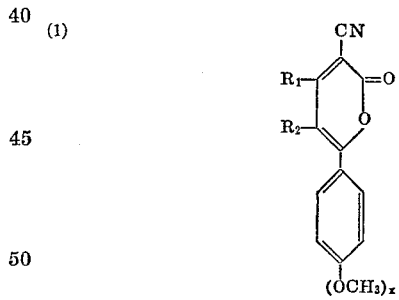

and (2)

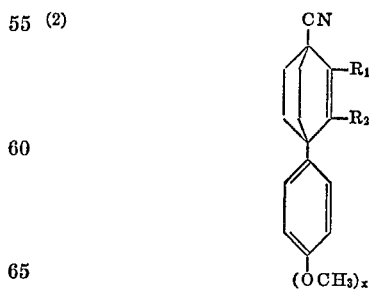

wherein $R_1$ and $R_2$ are the same or different and are methyl, ethyl, propyl, isopropyl, butyl, sec-butyl, isobutyl or tert-butyl; and
$x$ is 0 or 1

One preferred group of compounds of Formulae 1 and 2 are those compounds wherein $R_1$ and $R_2$ are separately either methyl or ethyl. Another preferred group are those compounds of Formulae 1 and 2 wherein $x$ is 1.

PREPARATION OF THE COMPOUNDS

The compounds of Formula 1 above of this invention can be conveniently synthesized by reacting a diketone of the formula:

(3)
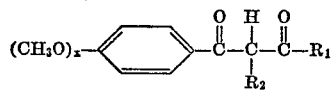

wherein $R_1$ and $R_2$ and $x$ are the same as in Formulae 1 and 2 above, with about a molar equivalent amount of ethyl cyanoacetate in a hydrocarbon solvent immiscible in water, in the presence of a catalytic amount of a mixture of ammonium acetate or an amino acid and glacial acetic acid, propionic acid or butyric acid to produce a compound of Formula 1 above.

The diketone starting material can be obtained by either of two general procedures as exemplified in Examples 1 and 1A, infra. Further, process techniques for making diketones is reported by H. Adkins, W. Kutz and D. Coffman in the Journal of the American Chemical Society, vol. 52, pages 3212–3221 (1930).

The solvent used in the reaction should be a hydrocarbon immiscible in water such as benzene, toluene or xylene. The amount of solvent used is not critical and will vary with the amount of reactants present.

The amount of ethyl cyano-acetate used is a molar equivalent based on the weight of the 1,3-diketone employed in the reaction.

The catalyst used is a mixture of ammonium acetate or an amino acid and glacial acetic acid, propionic acid or butyric acid. Typical amino acids for the catalyst mixture are alanine or leucine. One preferred catalyst ingredient is ammonium acetate. Glacial acetic acid is the preferred partner in the catalyst mixture.

The ratio of ingredients in the catalyst mixture is not critical. Satisfactory results are obtained with a ratio of one part by weight of ammonium acetate to two parts by weight of glacial acetic acid.

The α-pyrone product is obtained by using 5 to 10% by weight of catalyst mixture based on the weight of the 1,3-diketone employed. After adding the catalyst and refluxing for 24 hours, a further addition of 3 to 5% by weight of catalyst mixture followed by 24 hours of refluxing increases the yield of α-pyrone product. A still further addition of 3 to 5% by weight of catalyst mixture followed by still another 24 hours of refluxing further increases the yield of α-pyrone product.

The temperature used in the reaction will depend on the solvent used. It is preferred to run the reaction at about the refluxing temperature of the solvent.

Compounds of Formula 2 above are made by starting with a compound of Formula 1 in a hydrocarbon solvent such as benzene and heating this mixture at 200° C. with 2500 atmospheres of ethylene for up to 25 hours, in a pressure vessel. The product is a compound of Formula 2 above.

The compound of Formula 2 above can be converted into the desired pharmaceutically effective carboxylic acid by conventional techniques as exemplified by Example 12 infra and in my copending joint application Ser. No. 723,-596, filed Apr. 23, 1968.

UTILITY

The compounds of Formula 1 are intermediates for making the compounds of Formula 2 which in turn are intermediates for making dialkylbicyclo[2.2.2]oct-2-ene and octane-1 carboxylic acids, useful as antifertility or anti-implantation compounds. These latter compounds are fully described in my application Ser. No. 723,596, filed Apr. 23, 1968.

The following additional examples are provided to set forth specific details of this invention. In all the examples the amount of ingredient specified is by weight unless otherwise stated.

EXAMPLE 1

To a solution of 74.8 grams (0.39 mole) of 1-(p-methoxyphenyl)-1,3-butanedione in 500 ml. of anhydrous dimethylformamide were added 45 grams (0.4 mole) of potassium tert-butoxide. This mixture was maintained at a temperature of 40° C. while 80 grams (0.48 mole) of ethyl iodide were added. When all the ethyl iodide was added, the mixture was stirred at 45–50° C. for one-half hour. The mixture was then poured into 1500 ml. of water. The organic layer was separated and the aqueous layer was extracted with ether. The combined ether extracts were washed with water, dried over anhydrous magnesium sulfate, filtered and concentrated to give an oily product. The oil was distilled to give pure 3-anisoyl-2-pentanone: B.P. 118°/0.1 mm.

EXAMPLE 1A

To a suspension of one mole of sodium hydride on 500 ml. of anhydrous dimethylformamide was added a mixture of 0.5 mole of 1-(2,2-dimethyl)propyl phenyl ketone and 0.5 mole of ethyl acetate maintaining the temperature at 45–50° C. When it was all added, the mixture was stirred at 45–50° C. for four to five hours. The cooled mixture was poured into one liter of cold 2 N-hydrochloric acid. The organic layer was separated and the aqueous solution was extracted with ether. The combined ether extracts were washed with water, dried over anhydrous magnesium sulfate, filtered, and concentrated to give an oily product which was distilled to give pure 2-tert-butyl-1-phenyl-1,3-butanedione.

EXAMPLE 2

To a one-liter flask equipped with thermometer and Dean-Stark trap surmounted with a condenser, were charged 103 grams (0.53 mole) of 3-benzoyl-4-hexanone, 62 grams (0.54 mole) of ethyl cyanoacetate, 500 ml. of benzene, and a catalyst consisting of 5 grams of ammonium acetate, and 10 ml. of glacial acetic acid. The resulting mixture was heated under reflux with stirring. The water which formed was separated. After 24 hours, an additional three grams of ammonium acetate and three ml. of glacial acetic acid were charged into the mixture and the reflux continued. (This same addition of catalyst was repeated after 48 hours and again after 72 hours.) After 96 hours, the mixture was cooled to room temperature and washed with water, followed by 10% aqueous sodium bicarbonate solution. The benzene solution was dried over anhydrous magnesium sulfate, filtered, and concentrated to give an oily residue which solidified on addition of 95% ethanol. The solid was collected by filtration to give pure 3-cyano-4,5-diethyl-6-phenyl-α-pyrone; M.P. 125.5–127° C.

EXAMPLES 3–6

The process of Example 2 can be repeated substituting an equivalent amount by weight of indicated "1,3-diketone" for 3-benzoyl-4-hexanone of Example 2 to obtain the indicated "α-pyrone."

| Ex. | 1,3-diketone | α-Pyrone |
|---|---|---|
| 3 | 3-anisoyl-2-n-pentanone | 3-cyano-5-ethyl-6-(p-methoxyphenyl)-4-methyl-α-pyrone. |
| 4 | 3-benzoyl-2-n-pentanone | 3-cyano-5-ethyl-4-methyl-6-phenyl-α-pyrone: M.P. 147.5–149° C. |
| 5 | 3-anisoyl-2-methyl-4-n-pentanone. | 3-cyano-6-(p-methoxyphenyl)-4-methyl-5-isopropyl-α-pyrone. |
| 6 | 2-tert-butyl-1-phenyl-1,3-butanedione. | 3-tert-butyl-3-cyano-4-methyl-6-phenyl-α-pyrone. |

EXAMPLE 7

A solution of 10 grams of 3-cyano-5-ethyl-6-(p-methoxyphenyl)-4-methyl-α-pyrone in 10 ml. of benzene was heated at 200° C. with 2500 atmospheres of ethylene for 20 hours in a pressure vessel. The mixture was cooled and filtered. The filtrate was concentrated under reduced pressure to give an oily product which solidified on addition of 95% ethanol. The solid was collected by filtration and pure 1-cyano-3-ethyl-4-(p-methoxyphenyl)-2-methylbicyclo[2.2.2]oct-2-ene: M.P. 93.5–94.5° C.

EXAMPLES 8–11

The procedure of Example 7 can be repeated substituting an equivalent amount by weight of indicated "α-pyrone" for the 3-cyano - 5 - ethyl-6-(p-methoxyphenyl)-4-methyl-α-pyrone of Example 7 to obtain the indicated "bicyclooctane."

| Ex. | α-Pyrone | Bicyclooctane |
|---|---|---|
| 8 | 3-cyano-5-ethyl-4-methyl-6-phenyl-α-pyrone. | 1-cyano-3-ethyl-2-methyl-4-phenylbicyclo[2.2.2]oct-2-ene: M.P. 90–94° C. |
| 9 | 3-cyano-4,5-diethyl-6-phenyl-α-pyrone. | 1-cyano-2,3-diethyl-4-phenylbicyclo[2.2.2]oct-2-ene: M.P. 64–65.5° C. |
| 10 | 3-cyano-6-(p-methoxyphenyl)-4-methyl-5-isopropyl-α-pyrone. | 1-cyano-4-(p-methoxyphenyl)-2-methyl-3-isopropylbicyclo[2.2.2]oct-2-ene. |
| 11 | 5-butyl-3-cyano-4-ethyl-6-(p-methoxyphenyl)-α-pyrone. | 3-butyl-1-cyano-2-ethyl-4-(p-methoxyphenyl)bicyclo[2.2.2]oct-2-ene. |

EXAMPLE 12

A mixture of 1.6 grams of 1-cyano-3-ethyl-4-phenyl-2-methylbicyclo[2.2.2]oct-2-ene, 5 grams of potassium hydroxide in 40 ml. of diethylene glycol and 2 ml. of ethylene glycol monoethyl ether were heated at 170° C. for 17 hours under nitrogen atmosphere. The mixture was poured into 200 ml. of 1 N hydrochloric acid and the solid separated was collected by filtration. The solid was recrystallized from ethanol-water mixture to give pure 3-ethyl-2-methyl-4-phenylbicyclo[2.2.2]oct - 2 - ene-1-carboxylic acid: M.P. 200–205° C.

What is claimed is:

1. A bicyclooct-2-ene of the formula:

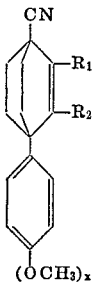

wherein
x is 0 or 1;
$R_1$ is selected from the group consisting of methyl, ethyl, propyl, isopropyl, butyl, sec-butyl, isobutyl and tert-butyl; and
$R_2$ is selected from the group consisting of methyl, ethyl, propyl, isopropyl, butyl, sec-butyl, isobutyl and tert-butyl.

2. A compound according to claim 1 wherein $R_1$ and $R_2$ are separately selected from the group consisting of methyl and ethyl.

3. A compound according to claim 1 wherein x is 1.

4. A compound according to claim 1 which is 1-cyano-3 - ethyl-4-(p-methoxyphenyl)-2-methylbicyclo[2.2.2]oct-2-ene.

5. A compound according to claim 1 which is 1-cyano-4-(p-methoxyphenyl) - 2 - methyl - 3 - isopropylbicyclo[2.2.2]oct-2-ene.

6. A compound according to claim 1 which is 1-cyano-2,3-diethyl-4-phenylbicyclo[2.2.2]oct-2-ene.

References Cited

UNITED STATES PATENTS 3,631,054   12/1971   Kauer _____ 260—343.5 X

LEWIS GOTTS, Primary Examiner

D. T. TORRENCE, Assistant Examiner

U.S. Cl. X.R.

260—343.5, 465 K, 469, 473 R, 515 R, 520, 590, 999